(12) United States Patent
Panusopone et al.

(10) Patent No.: US 6,483,874 B1
(45) Date of Patent: Nov. 19, 2002

(54) EFFICIENT MOTION ESTIMATION FOR AN ARBITRARILY-SHAPED OBJECT

(75) Inventors: Krit Panusopone; Xuemin Chen, both of San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/238,838

(22) Filed: Jan. 27, 1999

(51) Int. Cl.[7] .................................................. H04N 7/12
(52) U.S. Cl. ............................ 375/240.08; 375/240.09; 382/243
(58) Field of Search ..................... 375/240.08, 240.09, 375/240.12, 240.13, 240.16; 382/243, 237, 236, 238; 386/111

(56) References Cited

U.S. PATENT DOCUMENTS

| | | | | |
|---|---|---|---|---|
| 6,002,803 A | * | 12/1999 | Qian et al. ................... | 382/242 |
| 6,005,980 A | * | 12/1999 | Eifrig et al. ................ | 382/236 |
| 6,011,872 A | * | 1/2000 | Qian et al. .................. | 382/243 |
| 6,057,884 A | * | 5/2000 | Chen et al. .................. | 348/416 |
| 6,233,279 B1 | * | 5/2001 | Boon ..................... | 375/240.08 |
| 6,233,357 B1 | * | 5/2001 | Li et al. .................... | 382/248 |
| 6,243,418 B1 | * | 6/2001 | Kim ..................... | 375/240.12 |

FOREIGN PATENT DOCUMENTS

WO      00/45340    * 8/2000             H04N/7/36

* cited by examiner

*Primary Examiner*—Vu Le
(74) *Attorney, Agent, or Firm*—Barry R. Lipsitz

(57) ABSTRACT

An efficient motion estimation technique for an arbitrarily-shaped video object reduces the number of searches for motion estimation for shape coding and texture coding. The technique can be easily employed in an MPEG-4 encoder for coding Video Object Planes (VOPs). In a pixel loop, an m×m block traverses a reference video image with the video object, and the alpha plane value of each pixel is examined. If the alpha plane values in a block are not all the same, this indicates the block overlaps the object boundary. Accordingly, a shape coding mask value for the coordinate of a reference pixel in the block, such as the top, left pixel, is set to "1". As the block traverses the reference video image, a shape coding mask that generally follows the shape of the object boundary is developed to define a shaped reference image search area. A texture coding mask is defined similarly when the blocks overlap or are inside the object. When the same search range is used for both shape and texture motion estimation, the texture coding mask can be defined by ORing the shape coding mask with any blocks inside the object but not already included in the shape coding mask.

30 Claims, 10 Drawing Sheets

EFFICIENT MOTION ESTIMATION FOR AN ARBITRARILY-SHAPED OBJECT

BACKGROUND OF THE INVENTION

The present invention provides efficient motion estimation for an arbitrarily-shaped object for use in an object-based digital video coding system.

Object manipulation is one of the desirable features for multimedia applications. This functionality is available in the developing digital video compression standards, such as H.263+ and MPEG-4. For H.263+, refer to ITU-T Study Group 16, Contribution 999, Draft Text of Recommendation H.263 Version 2 ("H.263+") for Decision, Sep. 1997, incorporated herein by reference. For MPEG-4, refer to ISO/IEC 14496-2 Committee Draft (MPEG-4), "Information Technology—Coding of audio-visual objects: visual," JTC1/SC29/WG11 N2202 March 1998, incorporated herein by reference.

MPEG-4 uses a shape coding tool to process an arbitrarily shaped object known as a Video Object Plane (VOP). With shape coding, shape information, referred to as alpha planes, is obtained. Binary alpha planes are encoded by modified Content-based Arithmetic Encoding (CAE), while grey-scale alpha planes are encoded by a motion compensated Discrete Cosine Transform (DCT), similar to texture coding. An alpha plane is bounded by a rectangle that includes the shape of the VOP (Intelligent VOP formation). The bounding rectangle of the VOP is extended on the right-bottom side to multiples of 16×16 blocks, and the extended alpha samples are set to zero. The extended alpha plane is partitioned into blocks of 16×16 samples (e.g., alpha blocks) and the encoding/decoding process is performed on each alpha block.

Moreover, compression of digital video objects is important in view of the bandwidth-limited channels over which such data is communicated. In particular, motion compensation is the most popular tool to reduce the temporal redundancy in video compression.

Motion estimation and motion compensation (ME/MC) generally involve matching a block of a current video frame (e.g., a current block) with a block in a search area of a reference frame (e.g., a predicted block or reference block). For predictive (P) coded images, the reference block is in a previous frame. For bi-directionally predicted (B) coded images, predicted blocks in previous and subsequent frames may be used. The displacement of the predicted block relative to the current block is the motion vector (MV), which has horizontal (x) and vertical (y) components. Positive values of the MV components indicate that the predicted block is to the right of, and below, the current block.

A motion compensated difference block is formed by subtracting the pixel values of the predicted block from those of the current block point by point. Texture coding is then performed on the difference block. The coded MV and the coded texture information of the difference block are transmitted to the decoder. The decoder can then reconstruct an approximated current block by adding the quantized difference block to the predicted block according to the MV.

Efficiency of motion compensation depends greatly on the quality. of its encoding counterpart, motion prediction. Exhaustive search motion estimation is the most reliable method to predict the motion vector. However, this method suffers from its huge degree of complexity.

Many sub-optimum solutions have been proposed to alleviate the complexity of motion estimation. Most of them sacrifice the search quality to reduce the number of searches.

Full search motion estimation performs a search (also called block matching) for the block inside the search area in the reference picture that best describes the current block in the current picture. The displacement between the best-matched block and the current block, indicated by a motion vector, is later used in the motion compensation process to recover the current block. In other words, a block, B(z,t), at spatial position z and time t will be replaced by another block, B' (z',t'), at position z' in the reference picture at time t', and with a time difference, $\iota$ (=t-t'). The motion vector MV(z,t) in this case is the displacement between z' and z. Hence, $$B(z,t)=B(z',t')=B(z-MV(z,t),t-\iota);$$

and $$MV(z,t)=\min(D(B(z,t), B(z-MV(z,t),t-\iota))), \forall z' \in \text{search area around } z.$$

Moreover, $D(B(z,t),B(z',t'))$ is the prediction error, where "D" is a "delta". The error can be first order, e.g., an absolute difference, second order, e.g., a square difference, or any higher order. However, the complexity of the calculations increases with higher orders of the prediction error.

Motion estimation is a computationally intensive process. The contribution from all pixels in the block has to be considered in the prediction error calculation. Furthermore, all possible blocks in the search area are also needed to be matched in order to obtain a reliable motion vector. In general, a total of $(2n+1)^2 m^2$ comparisons is involved in a motion estimation of an m×m block with the search area of ±n pixels. For example, 278,784 pixel comparisons or 1,089 block searches are required for m,n=16.

Moreover, motion estimation for arbitrarily-shaped video object presents still further challenges.

There are various simpler alternatives to full search block matching in the literature. Most of them use a coarse-to-fine search strategy, e.g.; hierarchical motion estimation, a three-step search, a logarithm search, and so forth. These fast search algorithms subsample the reference picture into various scales and perform a full search starting from the coarsest scale. The subsequent searches, which occur at the finer scale, are limited to the surrounding pixel of the previous motion vector. The same process is repeated until the final result at the actual scale is obtained. However, these modifications are sub-optimum since they may choose only a locally optimal solution, and they generally use a full search method as their benchmark.

Accordingly, it would be desirable to provide an improved, more efficient shape and texture motion estimation system for digital video objects. The system should exploit the irregular boundary of the object to reduce the number of searches. The system should also be general enough to apply with any fast block matching alternative. The system should be applicable to arbitrarily-shaped video coding algorithms, such as MPEG-4.

The system should provide a shaped search area that follows a shape of the video object being coded.

The system should be useable in an MPEG-4 encoder or other object-based encoder.

The present invention provides a system having the above and other advantages.

SUMMARY OF THE INVENTION

The invention relates to an efficient motion estimation technique for an arbitrarily-shaped video object that reduces the number of searches for motion estimation for shape coding and texture coding. The invention is particularly suitable for use in an MPEG-4 encoder for coding Video Object Planes (VOPs).

Essentially, the invention provides a technique for shaping the search area for motion estimation according to the shape of the video object being coded.

A method for motion estimation coding of an arbitrarily-shaped video object includes the step of: determining whether successive blocks of pixels of at least a portion of the reference video image are outside the video object, overlap the video object, or are inside the video object. Each block, such as an mxm block, has a respective reference pixel and a plurality of associated neighboring pixels.

Respective mask values corresponding to positions of the respective reference pixels in the reference video image are provided according to whether the associated blocks are outside the video object, overlap the video object, or are inside the video object. The respective mask values indicate a search region in the reference video image for motion-estimation coding of the video object that corresponds to a shape of the video object The successive blocks are outside the video object when alpha plane values of the pixels in the block indicate an absence of the video object.

The successive blocks overlap the video object when alpha plane values of at least one of the pixels in the block indicate an absence of the video object, and alpha plane values of at least another one of the pixels in the block indicate a presence of the video object.

Moreover, the successive blocks are inside the video object when alpha plane values of the pixels in the block indicate a presence of the video object.

The respective mask values indicate a search region for (binary) shape motion estimation coding of the video object when the associated blocks overlap the video object.

More particularly, the respective mask values indicate a search region for shape motion estimation coding of the video object when the associated blocks overlap the video object, but are not outside or inside the video object in the reference video image.

The respective mask values indicate a search region for texture motion estimation coding of the video object when the associated blocks overlap the video object, and are inside the video object.

More particularly, the respective mask values indicate a search region for texture motion estimation coding of the video object when the associated blocks overlap the video object, and are inside the video object, but are not outside the video object.

The video object may comprise at least first and second Video Object Planes (VOPs), where the first VOP is in the reference video image, and the second VOP is in a current video image that uses the search region for motion estimation coding.

The respective reference pixel may be a top, left pixel in each of the successive blocks.

When a common search range is used for both shape and texture motion estimation coding of the video object, the respective mask values may be set for each of the blocks to indicate the search region for texture motion estimation by ORing: (a) the alpha plane values of the respective reference pixels of the blocks which indicate the search region for shape motion estimation with (b) the alpha plane values of the respective reference pixels of the blocks which are inside the video object in the reference video image.

Various options exist to improve the efficiency of the invention. For example, it is possible to examine alpha plane values of the pixels in a first block, store data corresponding to at least a portion of the alpha plane values which overlap a second block, and retrieve the stored data for use in determining whether the second block is outside, overlapping, or inside the video object. This avoids the need to repetitively determine the alpha plane values of the same pixels.

Additionally, if the video object is known or assumed to have a minimum size, further efficiencies can be achieved by subsampling the pixels of the reference video image according to a minimum size of the video object prior to determining whether the blocks are outside, overlapping, or inside the video object.

Or, without the need for subsampling, it is possible to examine the alpha plane values of only a portion of the pixels in the blocks (such as the outer pixels in a block) according to a minimum size of the video object.

A corresponding apparatus is also presented.

DETAILED DESCRIPTION OF THE INVENTION

The invention relates to an efficient motion estimation system for an arbitrarily-shaped video objects.

Coding of arbitrarily shaped object coding is the major additional feature in MPEG-4. Its main coding process includes two functions, i.e., shape coding and texture coding. Shape coding encodes the object boundary based on context-based arithmetic encoding (CAE). Context takes part of the predicted block when motion estimation is used. Texture coding encodes the detail inside the object by using the traditional block-based algorithm. A block on the boundary of the object will be padded from the boundary with the edge pixel, and then processed as a regular block.

Complexity issues are aggravated in MPEG-4 since motion vectors are allowed in both binary shape and texture coding (for both texture and gray-scale alpha), although, the MPEG-4 encoder somewhat reduces the number of searches by allowing motion vectors for opaque blocks (which are totally inside an object), or for boundary blocks (which are partially inside an object). Moreover, the concept of a bounding box to limit the background region in the coding area does not help much either. The alpha plane tends to be larger than necessary because noise associated with automatic segmentation always occurs at the corner of the alpha plane.

An identical figure of complexity remains in motion estimation of both shape and texture coding. In reality, an exhaustive search over the entire search area is redundant because of the arbitrary shape. Part of the search area that covers only the background does not have any chance of being matched. Efficient motion estimation is possible for an arbitrarily-shaped object by searching only on the effective search area. This opportunity has not existed before with conventional rectangular-shaped object.

The present invention defines an effective search area through the mask, and provides an implementation of a new motion estimation scheme.

Figure 1:
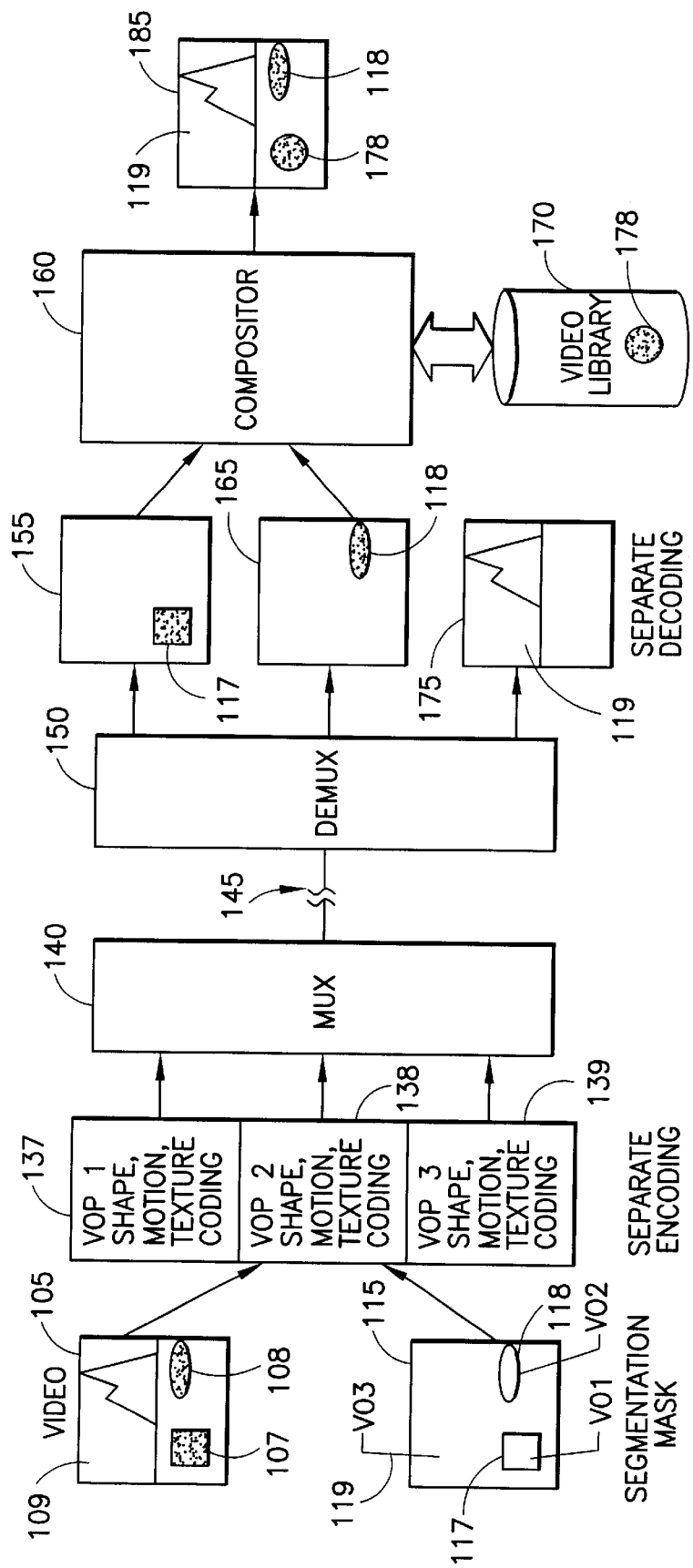
FIG. 1 is an illustration of a video object coding and decoding process in accordance with the present invention.

FIG. 1 is an illustration of a video object coding and decoding process in accordance with the present invention. Frame 105 includes three pictorial elements, including a square foreground element 107, an oblong foreground element 108, and a landscape backdrop element 109. In frame 115, the elements are designated VOPs using a segmentation mask such that VOP 117 represents the square foreground element 107, VOP 118 represents the oblong foreground element 108, and VOP 119 represents the landscape backdrop element 109.

A VOP can have an arbitrary shape, and a succession of VOPs is known as a video object. A full rectangular video frame may also be considered to be a VOP. Thus, the term "VOP" will be used herein to indicate both arbitrary and non-arbitrary image area shapes. A segmentation mask is obtained using known techniques, and has a format similar to that of ITU-R 601 luminance data. Each pixel is identified as belonging to a certain region in the video frame.

The frame 105 and VOP data from frame 115 are supplied to separate encoding functions. In particular, VOPs 117, 118 and 119 undergo shape, motion and texture encoding at encoders 137, 138 and 139, respectively. With shape coding, binary and gray scale shape information is encoded. With motion coding, the shape information is coded using motion estimation within a frame. With texture coding, a spatial transformation such as the DCT is performed to obtain transform coefficients which can be variable-length coded for compression.

The coded VOP data is then combined at a multiplexer (MUX) 140 for transmission over a channel 145. Alternatively, the data may be stored on a recording medium. The received coded VOP data is separated by a demultiplexer (DEMUX) 150 so that the separate VOPs 117–119 are decoded and recovered. Frames 155, 165 and 175 show that VOPs 117, 118 and 119, respectively, have been decoded and recovered and can therefore be individually manipulated using a compositor 160 which interfaces with a video library 170, for example.

The compositor may be a device such as a personal computer which is located at a user's home to allow the user to edit the received data to provide a customized image. For example, the user's personal video library 170 may include a previously stored VOP 178 (e.g., a circle) which is different than the received VOPs. The user may compose a frame 185 where the circular VOP 178 replaces the square VOP 117. The frame 185 thus includes the received VOPs 118 and 119 and the locally stored VOP 178.

In another example, the background VOP 109 may be replaced by a background of the user's choosing. For example, when viewing a television news broadcast, the announcer may be coded as a VOP which is separate from the background, such as a news studio. The user may act as a video editor, selecting a background from the library 170 or from another television program, such as a channel with stock price or weather information.

The video library 170 may also store VOPs which are received via the channel 145, and may access VOPs and other image elements via a network such as the Internet.

The frame 105 may include regions which are not VOPs and therefore cannot be individually manipulated. Furthermore, the frame 105 need not have any VOPs. Generally, a video session comprises a single VOP, or a sequence of VOPs.

The video object coding and decoding process of FIG. 1 enables many entertainment, business and educational applications, including personal computer games, virtual environments, graphical user interfaces, videoconferencing, Internet applications and the like.

Figure 2:
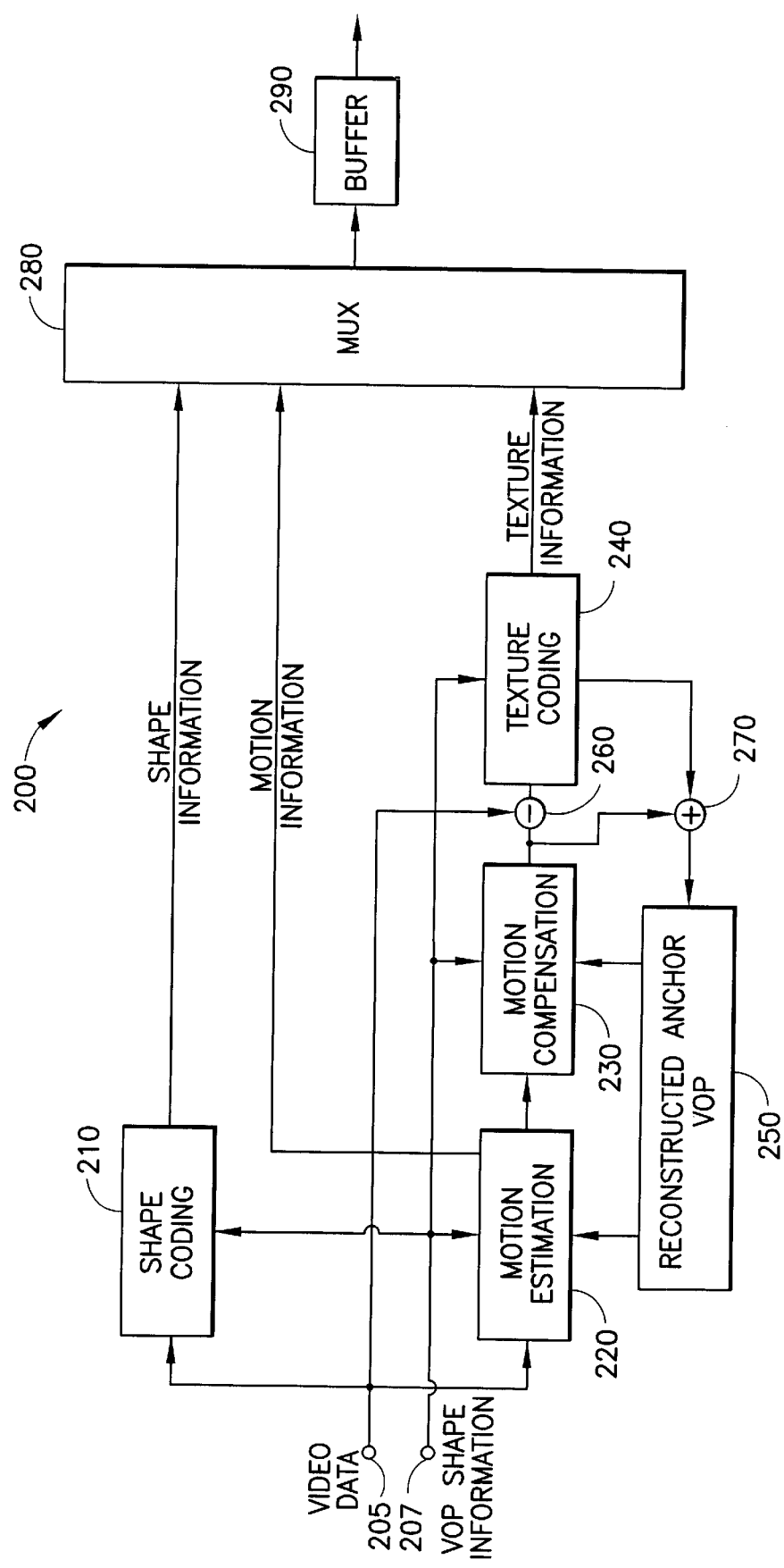
FIG. 2 is a block diagram of an encoder in accordance with the present invention.

FIG. 2 is a block diagram of an encoder in accordance with the present invention. The encoder is suitable for use with both predictive-coded VOPs (P-VOPs) and bi-directionally coded VOPs (B-VOPs).

P-VOPs may include a number of macroblocks (MBs) which may be coded individually using an intra-frame mode or an inter-frame mode. With intra-frame (INTRA) coding, the macroblock (MB) is coded without reference to another MB outside of the current VOP. With inter-frame (INTER) coding, the MB is differentially coded with respect to a temporally subsequent frame in a mode known as forward prediction. The temporally subsequent frame is known as an anchor frame or reference frame. The anchor frame (e.g., VOP) must be a P-VOP or an I-VOP, not a B-VOP. An I-VOP includes self-contained (e.g., intra-coded) blocks which are not temporally predictive coded.

With forward prediction, the current MB is compared to MB in a search area in the anchor frame to determine the best match. A corresponding motion vector (MV), known as a forward MV, describes the displacement of the current MB relative to the best match MB. Additionally, an advanced prediction mode for P-VOPs may be used, where motion compensation is performed on 8×8 blocks rather than 16×16 MBs. Moreover, both intra-frame and inter-frame coded P-VOP MBs can be coded in a frame mode or a field mode.

For texture coding, B-VOPs can use the forward prediction mode as described above in connection with P-VOPs as well as backward prediction, bi-directional prediction, and direct mode, which are all inter-frame techniques. The anchor frame (e.g., VOP) must be a P-VOP or I-VOP, not-a B-VOP. However, for shape coding of B-VOPs, only the closest anchor/reference picture is used for motion estimation.

With backward prediction of B-VOPs, the current MB is compared to a search area of MBs in a temporally subsequent anchor frame to determine the best match. A corresponding MV, known as a backward MV, describes the relative displacement of the current MB relative to the best match MB. With bi-directional prediction of a B-VOP MB, the current MB is compared to a search area of MBs in both a temporally previous anchor frame and a temporally subsequent anchor frame to determine the best match MBs. Forward and backward MVs describe the displacement of the current MB relative to the best match MBs. Additionally, an averaged image is obtained from the best match MBs for use in encoding the current MB.

With direct mode prediction of B-VOPs, a MV is derived for an 8×8 block when the collocated MB in the following P-VOP uses the 8×8 advanced prediction mode. The MV of the 8×8 block in the P-VOP is linearly scaled to derive a predictive MV for the block in the B-VOP. The MV of each 8×8 block is its predictive MV plus a delta MV which is the same for all blocks in the MB.

The encoder, shown generally at 200, includes a shape coder 210, a motion estimation function 220, a motion compensation function 230, and a texture coder 240, which each receive video pixel data input at terminal 205. The motion estimation function 220, motion compensation function 230, texture coder 240, and shape coder 210 also receive VOP shape information input at terminal 207, such as the MPEG-4 parameter VOP_of_arbitrary_shape. When this parameter is zero, the VOP has a rectangular shape, and the shape coder 210 therefore is not used.

A reconstructed anchor VOP function 250 provides a reconstructed anchor VOP for use by the motion estimation function 220 and motion compensation function 230. A current VOP is subtracted from a motion compensated previous VOP at subtractor 260 to provide a residue which is encoded at the texture coder 240. The texture coder 240 performs the DCT to provide texture information (e.g., transform coefficients) to a multiplexer (MUX) 280. The texture coder 240 also provides information which is summed with the output from the motion compensator 230 at a summer 270 for input to the previous reconstructed VOP function 250.

Motion information (e.g., motion vectors) is provided from the motion estimation function 220 to the MUX 280, while shape information which indicates the shape of the VOP is provided from the shape coding function 210 to the MUX 280. The MUX 280 provides a corresponding multiplexed data stream to a buffer 290 for subsequent communication over a data channel.

The pixel data which is input to the encoder has a specified color format. The VOP is represented by means of a bounding rectangle. The top left coordinate of the bounding rectangle is rounded to the nearest even number not greater than the top left coordinates of the tightest rectangle which is generated in the intelligent VOP formation. Accordingly, the top left coordinate of the bounding rectangle in the chrominance component is one-half that of the luminance component.

Figure 3:
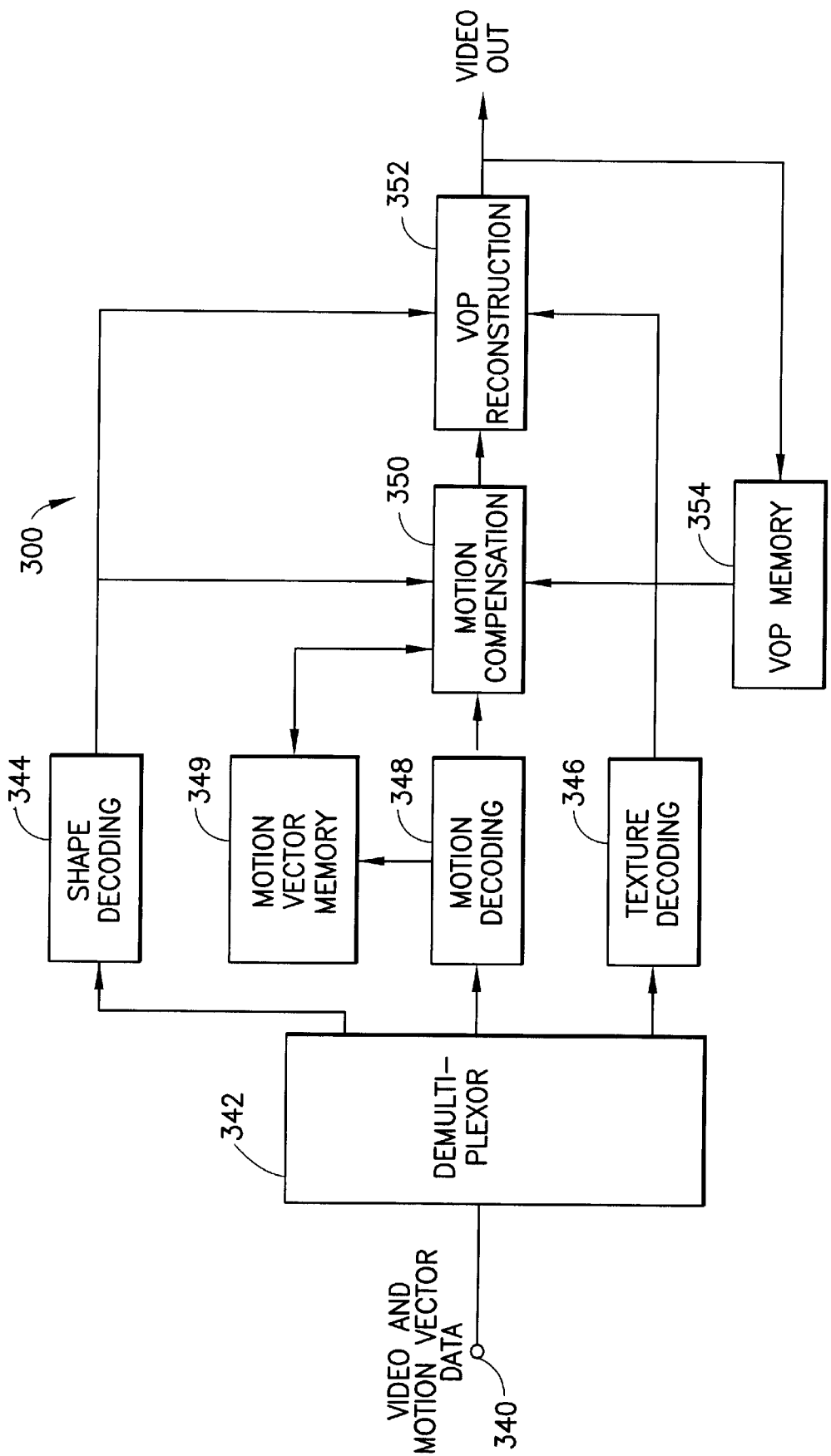
FIG. 3 is a block diagram of a decoder in accordance with the present invention.

FIG. 3 is a block diagram of a decoder in accordance with the present invention. The decoder, shown generally at 300, can be used to receive and decode the encoded data signals transmitted from the encoder of FIG. 2. The encoded video image data and differentially encoded motion vector (MV) data are received at terminal 340 and provided to a demultiplexer (DEMUX) 342. The encoded video image data is typically differentially encoded in DCT transform coefficients as a prediction error signal (e.g., residue).

A shape decoding function 344 processes the data when the VOP has an arbitrary shape to recover shape information, which is, in turn, provided to a motion compensation function 350 and a VOP reconstruction function 352. A texture decoding function 346 performs an inverse DCT on transform coefficients to recover residue information. For INTRA coded macroblocks (MBs), pixel information is recovered directly and provided to the VOP reconstruction function 352.

For INTER coded blocks and MBs, such as those in B-VOPs, the pixel information provided from the texture decoding function 346 to the reconstructed VOP function 352 represents a residue between the current MB and a reference image. The reference image may be pixel data from a single anchor MB which is indicated by a forward or backward MV. Alternatively, for an interpolated (e.g., averaged) MB, the reference image is an average of pixel data from two reference MBs, e.g., one past anchor MB and one future anchor MB. In this case, the decoder must calculate the averaged pixel data according to the forward and backward MVs before recovering the current MB pixel data.

For INTER coded blocks and MBs, a motion decoding function 348 processes the encoded MV data to recover the differential MVs and provide them to the motion compensation function 350 and to a motion vector memory 349, such as a RAM. The motion compensation function 350 receives the differential MV data and determines a reference motion vector (e.g., predictor motion vector, or PMV) in accordance with the present invention. The PMV is determined according to the coding mode (e.g., forward, backward, bi-directional, or direct).

Once the motion compensation function 350 determines a full reference MV and sums it with the differential MV of the current MB, the full MV of the current MB is available. Accordingly, the motion compensation function 350 can now retrieve anchor frame best match data from a VOP memory 354, such as a RAM, calculate an averaged image if required, and provide the anchor frame pixel data to the VOP reconstruction function to reconstruct the current MB.

The retrieved or calculated best match data is added back to the pixel residue at the VOP reconstruction function 352 to obtain the decoded current MB or block. The reconstructed block is output as a video output signal and also provided to the VOP memory 354 to provide new anchor frame data. Note that an appropriate video data buffering capability may be required depending on the frame transmission and presentation orders since an anchor frame for a B-VOP MB may be a temporally future frame or field, in presentation order.

Figure 4:
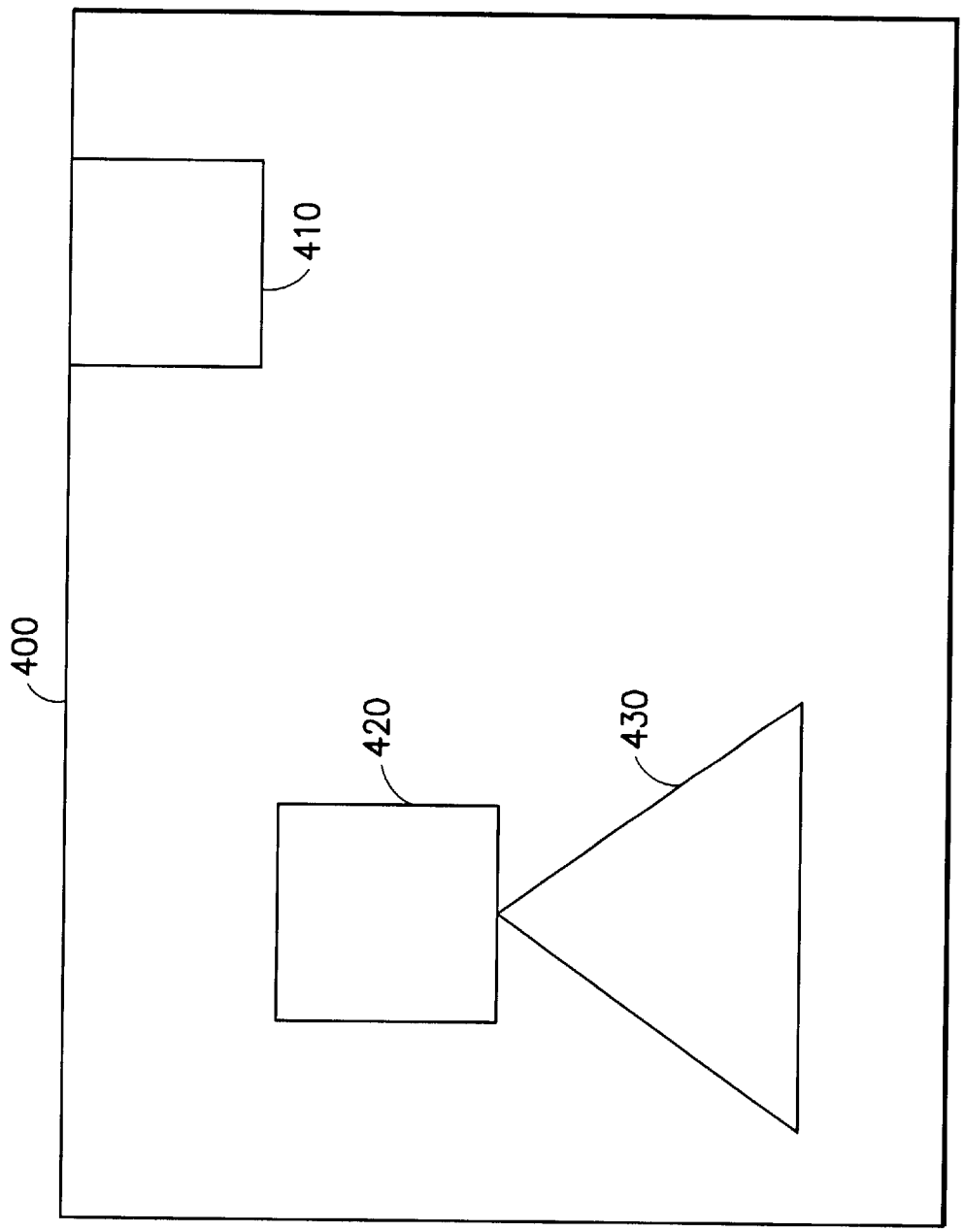
FIG. 4 illustrates three example objects in a video frame for processing in accordance with the present invention.

FIG. 4 illustrates three example objects in a video frame for processing in accordance with the present invention. The reference frame 400 includes video objects 410, 420 and 430. Object 410 is at the boundary of the frame 400. The objects may have any arbitrary shape. Squares and a triangle are shown here only for illustration.

An alpha plane, assuming that it is binary, is "0" outside the object and "255" otherwise. An area that is close enough to the object boundary, either on the background or foreground, is the effective search area.

In accordance with the present invention, the alpha value is switched at a distance of up to m−1 pixels from the boundary pixel of the object. A suggested implementation of the proposed technique for shape coding is as following.

1A. Perform a pixel loop over the entire reference picture. The loop may progress in any orderly manner, e.g., from the top pixel line to the bottom pixel line in the frame 400, and from left to right in each pixel line. At each pixel (e.g., "reference pixel"), designated by the coordinates (x,y) within the frame 400, perform an m×m block loop using the reference pixel as the top left coordinate, for example. Note that it is not required to use an m×m square block, as other block shapes are possible, e.g., m×n, where m≠n. The block need not be square or rectangular, but can be generally circular, or extend diagonally in the reference image, for example. Moreover, the block may have an unsymmetric shape. The term "block" as used herein in therefore meant to encompass any shape. See the C-language like pseudo code A, below.

Also, it is possible to vary the block shape for different (x,y) coordinates in the frame. For example, regions in the center of the frame may be more likely to exhibit larger ranges of motion and can therefore be provided with a different alpha switching distance (e.g., smaller block size or larger search area) from the object boundary.

Moreover, the reference pixel need not be the top, left pixel in the block but may have any specified corner position in the block.

2A. While in the block loop, check if the alpha plane value of the reference pixel is the same as the alpha plane values of the other pixels in the block. If any pixel has a different alpha value in a block, set the mask at (x,y) to "1". This indicates the block overlaps a boundary of the video object. Otherwise, maintain the mask value at (x,y) at 0. This indicates the block is either outside or inside the video object, but not overlapping. See pseudo code A, below.

3A. The new mask for shape coding is obtained from all (x,y) values of "1" in the frame 100, and corresponds to the effective search area of the object (see FIG. 5 and the associated discussion, below). During shape coding ME of the video object in a current image, a search operation is performed in the frame 400. However, in accordance with the present invention, the mask value is checked inside the full search loop to determine if the corresponding (x,y) mask value is "1". If the mask value is "1", the search proceeds at that (x,y) position. Otherwise, the reference pixel position (x,y) is skipped for shape coding, and the processing continues at the next pixel.

In this manner, the search area in the reference or anchor image is generally provided with a contour or shape that follows the contour of the video object. Motion estimation coding of the video object (e.g., VOP) in the current image is thereby simplified.

Note that for shape coding, there is no need to search outside the current frame, e.g., for blocks which overlap the edge of the frame.

See the C-language like pseudo code B, below.

The procedure is slightly different for texture coding. Detail inside the object in the reference image is now as important as the detail along the boundary of the object. The only pixel data that can be left out for texture coding is pixel data that is not covered by the foreground object. The area that is in the background of the object, and is close enough to the object boundary, is the effective search area.

Figure 6:
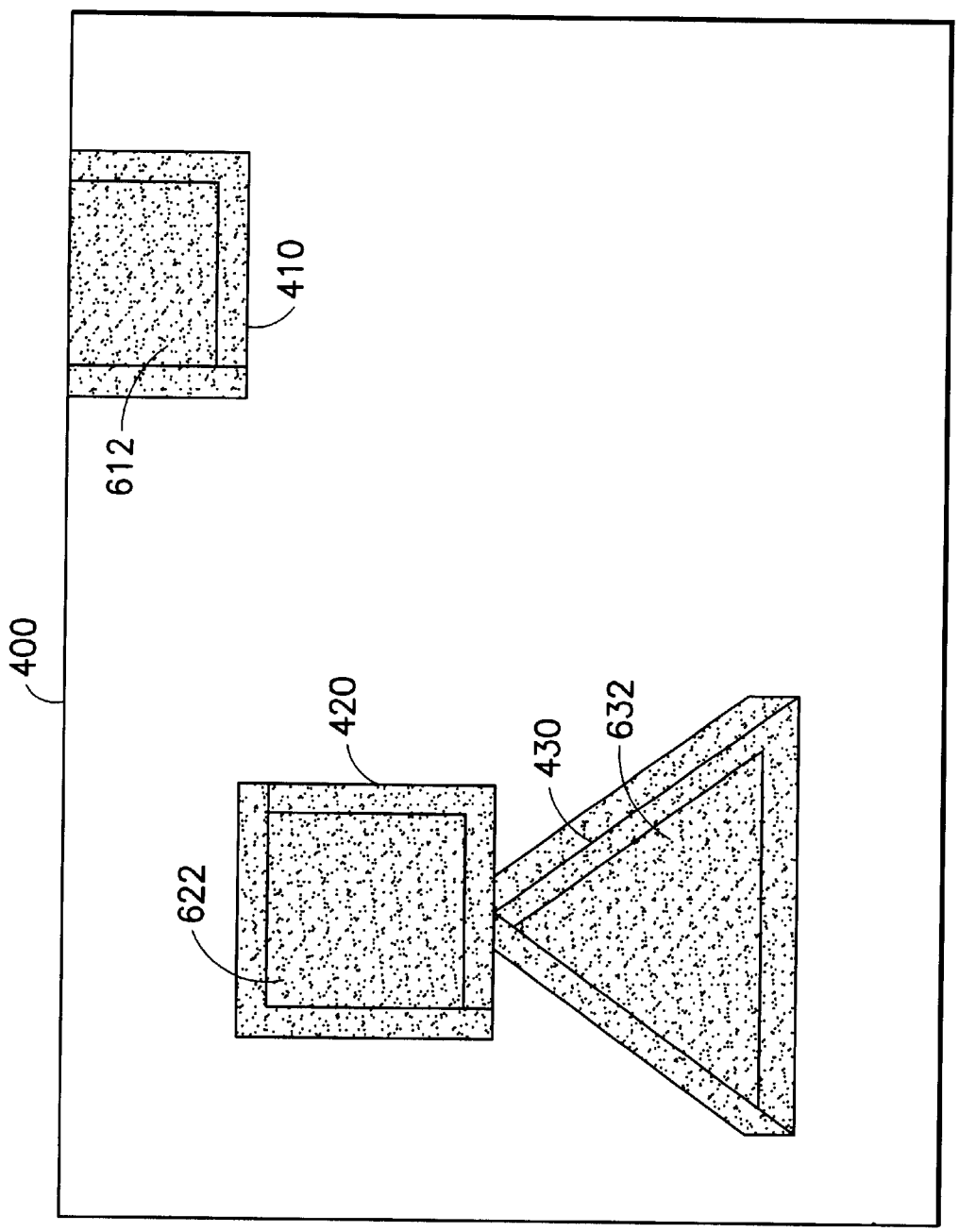
FIG. 6 illustrates an effective search area for texture motion estimation of the arbitrarily-shaped video objects of FIG. 4 in accordance with the present invention.

An example of the effective search area for texture coding is shown in FIG. 6. The same alpha plane switching distance as in shape coding case applies (i.e., up to m-1 pixels from the object boundary). A suggested implementation of the proposed technique for texture coding in accordance with the present invention is as follows.

1B. Perform a pixel loop over the entire reference picture. At each pixel (x,y), perform a block loop using the reference pixel (x,y) as the top left coordinate. See pseudo code A, below.

2B. While in the block loop, check if the alpha plane remains "0" for each pixel in the current block. This indicates the block is outside the video object in the reference image. If any pixel has an alpha value of "255" in the current block, set the mask at (x,y) to "1". This indicates the block is overlapping or inside the video object. If all the pixels have alpha values of "255" in the current block, this indicates the block is inside the video object. Otherwise, e.g., no pixel has an alpha value of "255" in the current block, the block is outside the video object, so maintain the current mask value of "0". See pseudo code A, below.

3B. The new mask corresponds to the effective search area of that object for texture coding. Check with this mask inside the full search loop during texture coding. If the mask value is "1", go ahead with the search at that position; otherwise skip the current position, and continue processing at the next pixel. See pseudo code B, below.

For texture coding, if a block overlaps the edge of the reference frame, a padded area outside the frame should be searched.

Note that an additional computation comes from the mask formation. The suggested implementation requires 2((p−m+1)×(q−m+1)) blocks loop, where p and q are the height and width of the picture, respectively. A more efficient algorithm without a quality trade-off is possible via a better mask generation. For example, the two masks together (i.e., the shape coding mask and the texture coding mask) can be combined, and three symbols can be designated to classify each area, i.e., outside the object, on the boundary, or inside the object.

Additionally, to reduce operations, alpha plane values from each block can be stored in memory and re-used for successive blocks. In one such implementation, assuming a left to right progression of the blocks across the reference image, all data except the rightmost row in the calculation of the mask generation is the same as the data in the calculation of the adjacent block to the left (subtracting by the leftmost row). Following this concept, the implementation requires (m−1) (q+m−1)+m+2(m−1)+(p−1)(2q+3(m−1)+2(q−1)) operations. See the C-language like pseudo code C, below.

Pseudo code A—Mask Generation:

```
Int Find_search_range(Int  *mask, Int  *alpha, Int
width, Int  height)
{
    Int  j, k, l, m;
    For (j=0 ; j< height ; j++)
        For (k=0 ; k< width; k++) {
            *(mask + k * width + j ) = 0;
            for (l=0 ; l< 16 ; l++)
                for (m=0 ; m< 16 ; m++) {
                    if ((j+1 < height) && (k+m
< width) )
                        if
(* (alpha+(j+1) *width+k))
                            *(mask+j*width+k) = 1;
                }
        }
    return(0);
}
Pseudo code B - Motion estimation based on the
effective search area:
Int Full_search(Int  *org, Int  *ref, Int  *mot_x,
Int  *mot_y, Int  ox, Int  oy, Int  mvs_x, Int
mvs_y)
{
    For (iy=-MV_RANGE ; iy< MV_RANGE ; iy++)
        For (ix=-MV_RANGE ; ix< MV_RANGE ; ix++)  {
            Search_total++;
```

-continued

```
If
(* (mask+ix+ox+mvs__x+(iy+oy+mvs__y) *width_prev)==0) {
    Save_total++;
    Goto nextplease;
}
/* Find prediction in the reference frame based on
(ix,iy) */
    nextplease:
        ;
/* Check the error from this predicted block with
the min_error */
    }
}
Pseudo code C - Mask generation with the storage of
the reused results:
Void Mask_gen(Int *p0, Int *p1, Int height, Int
width, Int blocksize, Int searchsize)
{
int I,j,xmax,sx,sy,base[searchsize+blocksize-1];
xmax = blocksize;
m = searchsize;
sx = width;
sy = height;
for (i=0 ; i<sx+m-1 ; i++)
{
    base[i] = (int)p1[i];
    for (j=1 ; j<m ; j++)
    base[i] += (int)p1[i+xmax*j];
}
P0[0] = base[0];
for (k=1 ; k<m ; k++)
    P0[0] += base[k];
for (i=1 ; i<sx ; i++)
    P0[i] = P0[i-1]+base[i+m-1]-base[i-1];
for (j=1 ; j<sy ; j++)
{
    P0[sx*j] = 0;
    for (i=0 ; i<sx+m-1 ; i++)
    base[i] += (int)p1[i+xmax*(j+m-1)] -
    (int)p1[i+xmax*(j-1)];
    for (k=0 ; k<m ; k++)
    P0[sx*j]  += base[k];
    for (i=1 ; i<sx ; i++)
    P0[i+sx*j] = P0[i-1+sx*j]+base[i+m-1]-base[i-
1];
}
/* P0[a] is the mask value at search position a. a
is outside the object if P0[a] = 0, a is at the
boundary of the object if 0 < P0[a] < 255m$^s$ and a is
inside object if P0[a] = 255m$^2$. */
}
```

Figure 5:
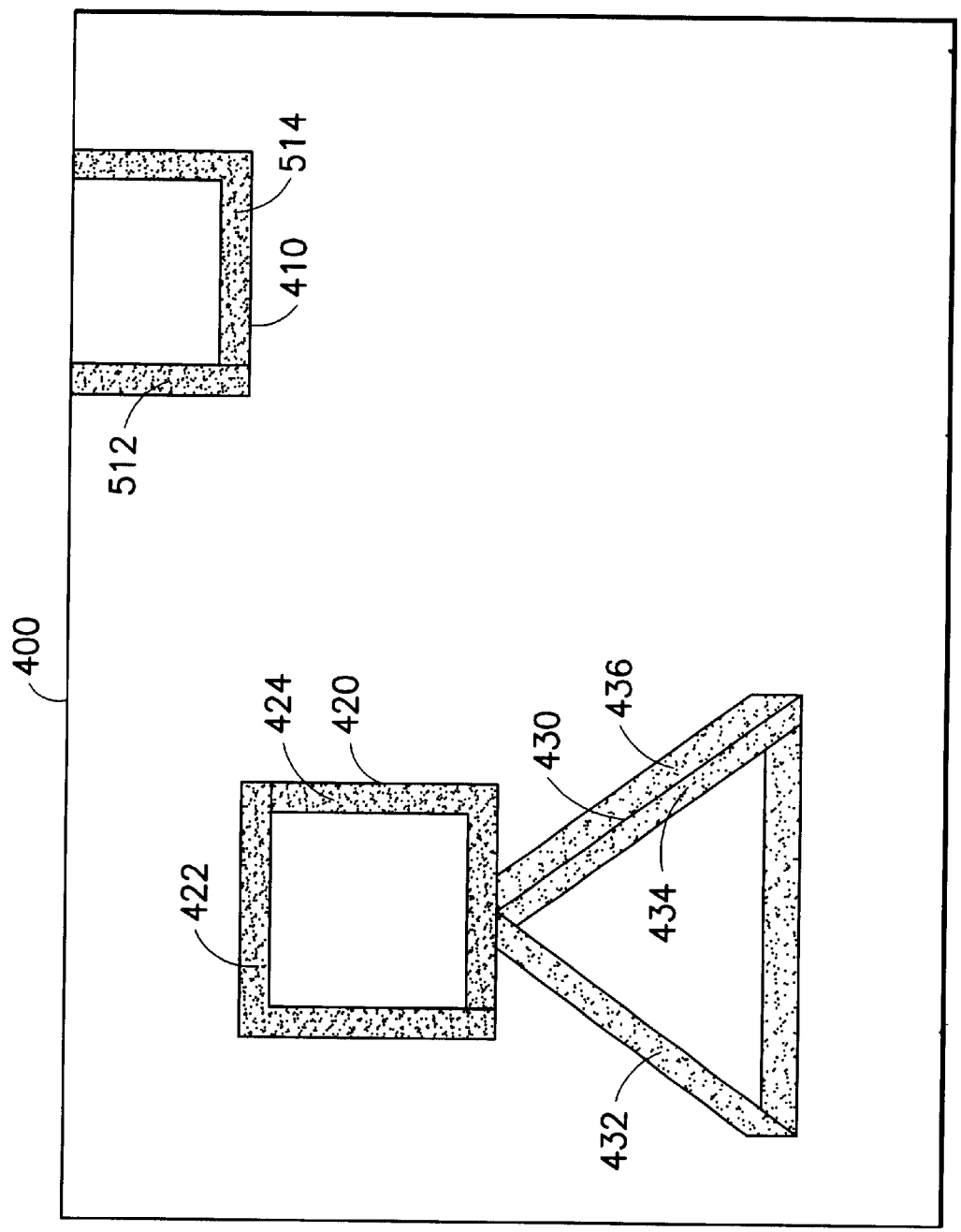
FIG. 5 illustrates an effective search area for shape motion estimation of the arbitrarily-shaped video objects of FIG. 4 in accordance with the present invention.

FIG. 5 illustrates an effective search area for shape motion estimation of the arbitrarily-shaped video objects of FIG. 4 in accordance with the present invention. The effective search areas (e.g., where the mask="1") of the objects 410, 420 and 430 are illustrated by the shaded regions.

For example, for object 410, the shaded region 512 is provided to the left of the left-hand boundary, and the shaded region 514 is provided above the lower boundary, and to the left of the right-hand boundary (refer to steps 1A and 2A, above).

For object 420, the shaded region 422 is provided above the top boundary, and to the left of the left-hand boundary. The shaded region 424 is provided to the left of the right-hand boundary, and above the lower boundary.

For object 430, the shaded region 432 is provided to the left of the slanted left-hand boundary. The shaded region 434 is provided to the left of the slanted right-hand boundary, and above the lower boundary. The shaded region 436 is provided to the right of the slanted right-hand boundary.

Therefore, when motion estimation of the objects in a current frame is performed, e.g., using the reference frame 400, which is a temporally previous and/or subsequent reference/anchor image (in display order), the search area will follow the shape of the video object in the reference frame.

Computational saving will results since the search area is tailored to the specific shape of the coded video object.

FIG. 6 illustrates an effective search area for texture motion estimation of the arbitrarily-shaped video objects of FIG. 4 in accordance with the present invention. The effective search areas (e.g., where the mask="1") of the objects 410, 420 and 430 are illustrated by the shaded regions.

If the same search range is used for shape and texture motion estimation, the shaded regions are the same as those of FIG. 5, with the addition of the interior regions 612, 622 and 632 of the objects 410, 420 and 430, respectively. In this case, the mask for texture coding can be obtained by ORing the mask for shape coding with the original objects (i.e., ORing FIGS. 4 and 5, respectively).

Otherwise, if a different search range is used for shape and texture motion estimation, a separate pass as described in steps 1B–3B is required to obtain the texture coding mask.

Figure 7:
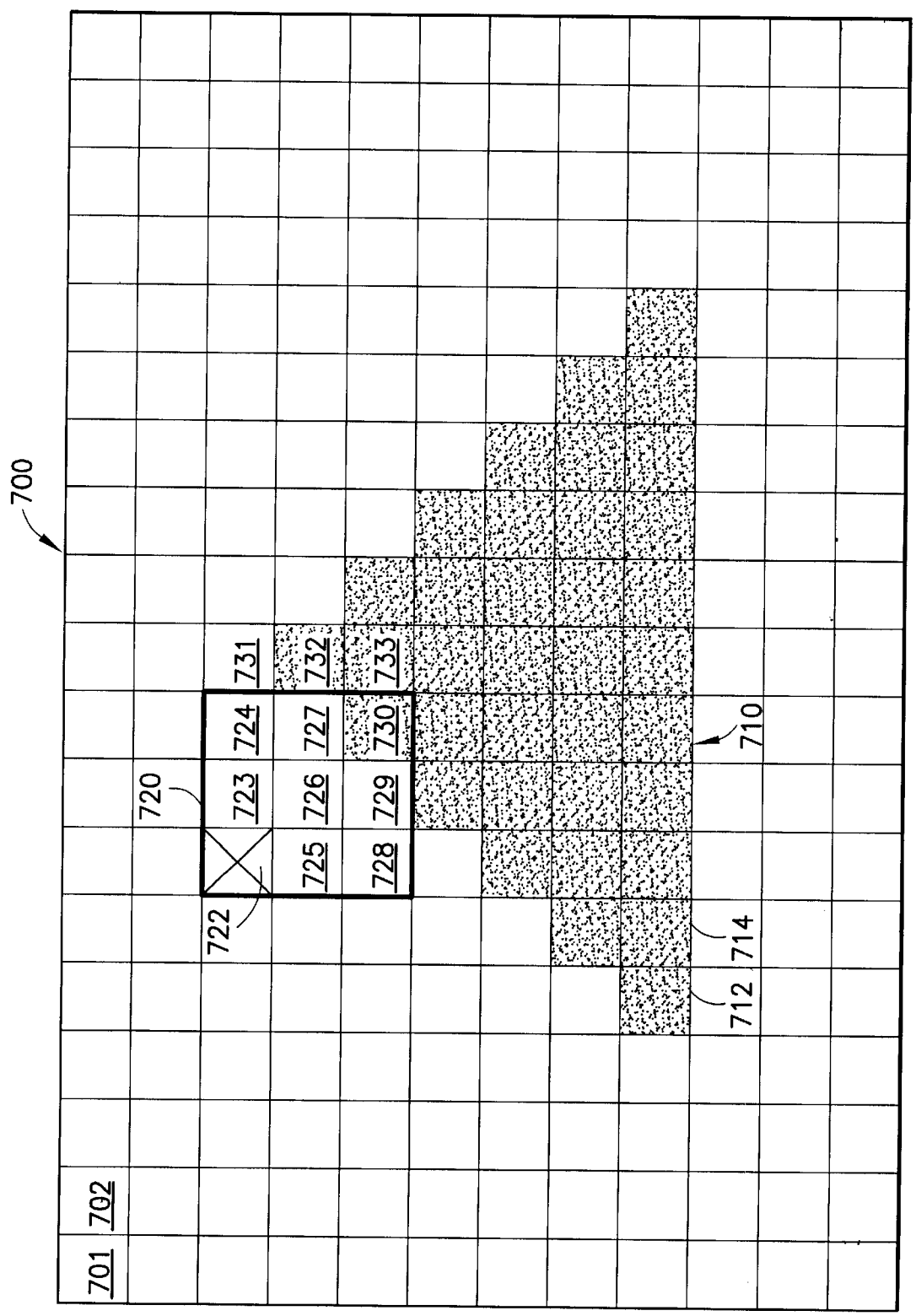
FIG. 7 illustrates setting a mask value=1 for the reference pixel of a block for shape motion estimation in accordance with the present invention.

FIG. 7 illustrates setting a mask value=1 for the reference pixel of a block for shape motion estimation in accordance with the present invention. An example reference image area 700 includes individual pixels, e.g., including pixels 701, 702. An example triangular object 710 includes the shaded pixels, e.g., including pixels 712, 714.

As discussed previously, in steps 1A and 2A, a pixel loop is performed over the entire reference picture. Of course, if it is known that a video object is located only within a constrained region of the picture, only this region need be examined. At each reference pixel, a block loop is performed using the reference pixel (x,y) as the top left coordinate. Here, a m×m or 3×3 block is used although the block can have any shape, as discussed above. The 3×3 block 720 includes a reference pixel 722 at coordinates (x,y) at the top left of the block, and pixels 723–730.

Additionally, while in the block loop, a check is made to determine if the alpha plane value of the reference pixel 722 is the same as the alpha plane values of the other pixels 723–730 in the block 720. If any pixel has a different alpha value in a block, the block overlaps the object 710, and the mask for shape coding at (x,y) is set to "1". Otherwise, the block is only outside or inside the object 710, and the mask value is maintained at (x,y) at 0.

Here, each pixel in the object 710 (i.e., the shaded pixels) has an alpha plane value of "255", while the pixels outside the object (i.e., the unshaded pixels) have an alpha plane value of 0. For the block 720, pixel 730 has a different alpha plane value than at least one of the remaining pixels in the block (i.e., pixel 730). Accordingly, the mask value is set to "1" for the (x,y) coordinate of the reference pixel 722. Note that pixel 730 is at the boundary of the object 710. The block 720 therefore overlaps the boundary of the object 710 since it includes pixels inside and outside the object 710.

After setting the mask value at the current coordinate, the block 720 is shifted, e.g., one pixel to the right, and the procedure is repeated to set a mask value for shape coding for the new pixel coordinate 723.

As discussed previously, to reduce operations, alpha plane values from each block can be stored in memory and re-used for successive blocks. For example, during processing of the block 720, the alpha plane values for pixels 723, 724, 726, 727, 729 and 730 can be stored in a memory. Then, for the next block, which includes pixels 723, 724, 731, 726, 727, 732, 729, 730 and 733, only the alpha plane values of pixels 731–733 will have to be determined since the alpha plane values of the remaining pixels can be retrieved from the memory.

The process continues for each current block, storing a portion of the alpha plane values from the previous block which overlaps with the current block.

Additional efficiencies can be achieved if it is known that a minimum object size is present by subsampling (e.g., downsizing) the image prior to performing the pixel and block loops. For example, if it is known or assumed that the minimum block size is 4×4 pixels, the image can be sub-sampled by 4:1 vertically and horizontally.

Or, the examination of the alpha plane values in a block can proceed using the outer pixels only, so there is no need to examine a region of inner pixels which is smaller than the minimum object size. For example, referring to block 720, and assuming a minimum object size of 2×2 pixels, it is not necessary to examine the alpha plane value of pixel 726. Only the values of the outer pixels 722–725 and 727–730 need be examined.

Figure 8:
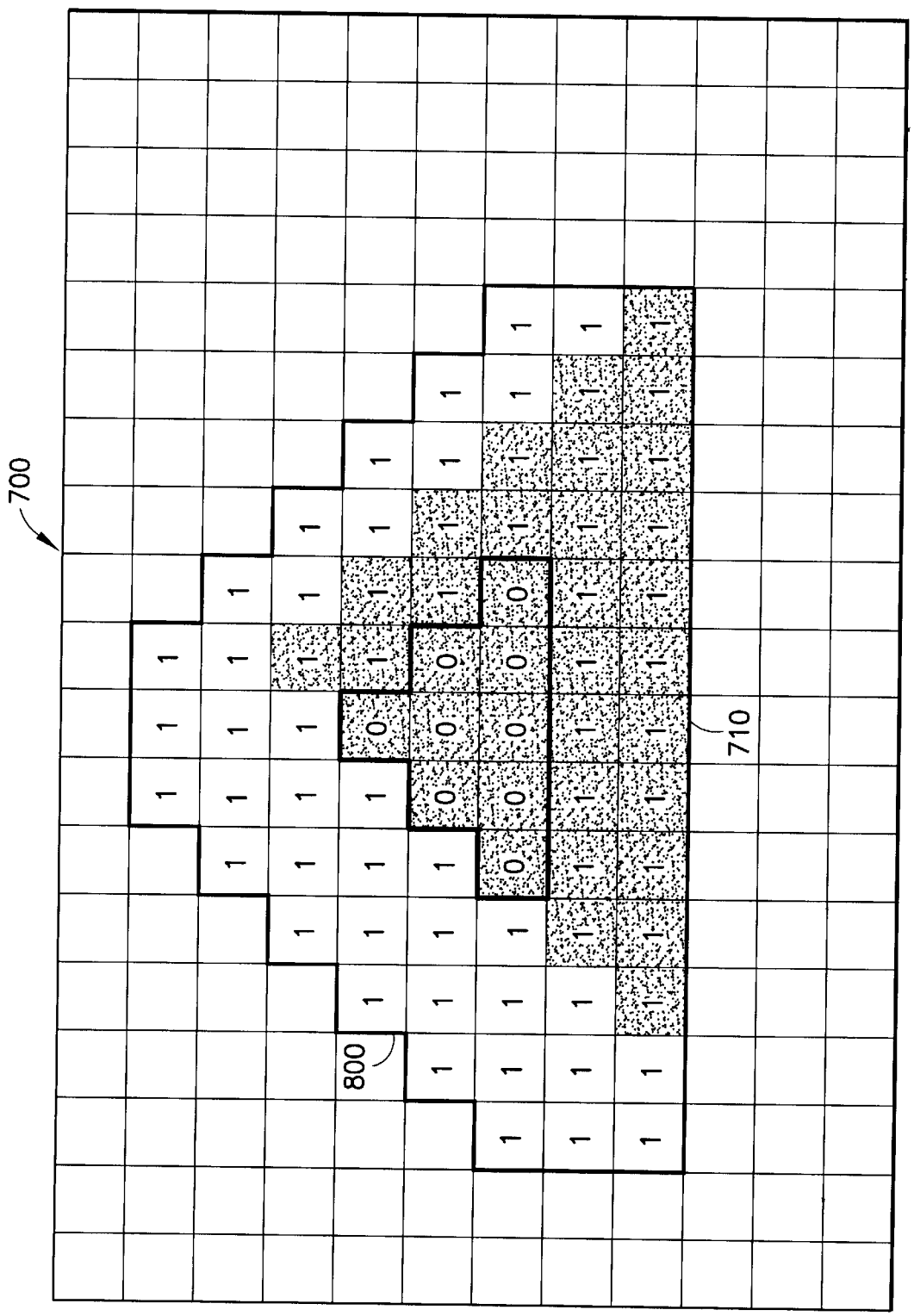
FIG. 8 illustrates mask values for shape motion estimation of the video object of FIG. 7 in accordance with the present invention.

FIG. 8 illustrates mask values for shape motion estimation of the video object of FIG. 7 in accordance with the present invention. Once the pixel loop and block loops are completed in steps 1A and 2A, a final mask for shape coding is determined.

Here, a mask, shown generally at 800, includes all pixels with the mask value "1", which designate the search area for shape coding. The search area in the reference image 700 does not include the pixel positions with a mask value of "0" (i.e., those pixels marked "0" or not marked).

Figure 9:
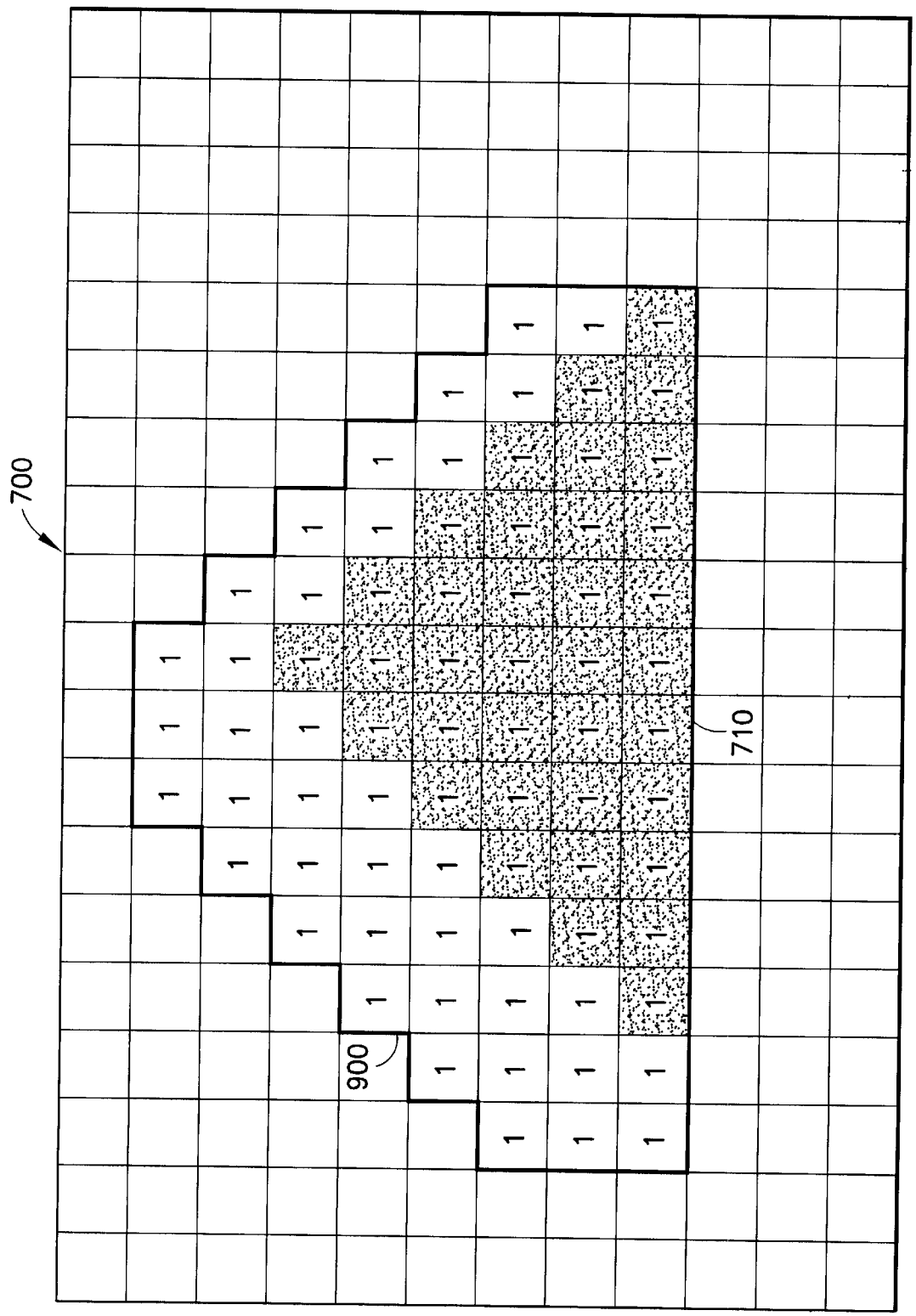
FIG. 9 illustrates mask values for texture motion estimation of the video object of FIG. 7 in accordance with the present invention.

FIG. 9 illustrates mask values for texture motion estimation of the video object of FIG. 7 in accordance with the present invention.

Referring back to steps 1B and 2B, a pixel loop is performed over the entire reference picture 700, and a block loop is performed at each pixel coordinate (x,y). While in the block loop, a check is made to determine if the alpha plane remains "0" for each pixel in the current block. If any pixel has an alpha value of "255" in the current block, the mask value at (x,y) is set to "1". Otherwise, the current mask value is maintained at "0".

Here, a mask, shown generally at 900, defines a search area for texture coding corresponding to the pixel positions with the mask value "1". All other pixels coordinates in the image 700 have a mask value of "0", and the corresponding search positions in the reference image 700 are not used for texture coding.

Figure 10:
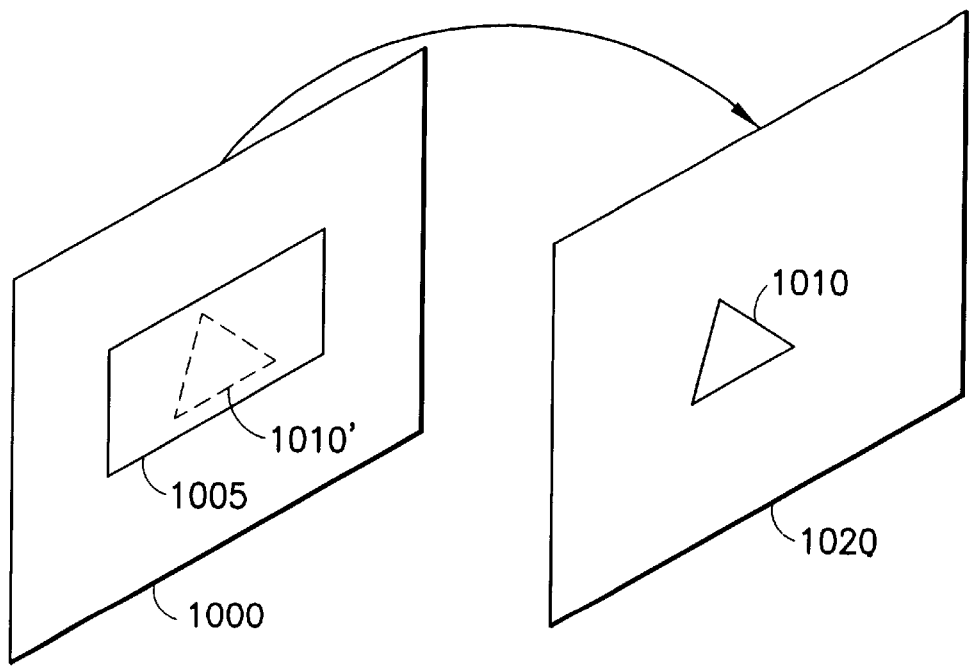
FIG. 10 illustrates a conventional search area for motion estimation.

FIG. 10 illustrates a conventional search area for motion estimation. A current frame 1020 includes a video object 1010 (e.g., VOP). A reference frame 1000 includes a search area 1005 that is typically rectangular, and does not correspond to the shaped of the object 1010'. Object 1010 corresponds to object 1010' at the time instant of the frame 1020, and it relates to object 1010' by the MV.

Figure 11:
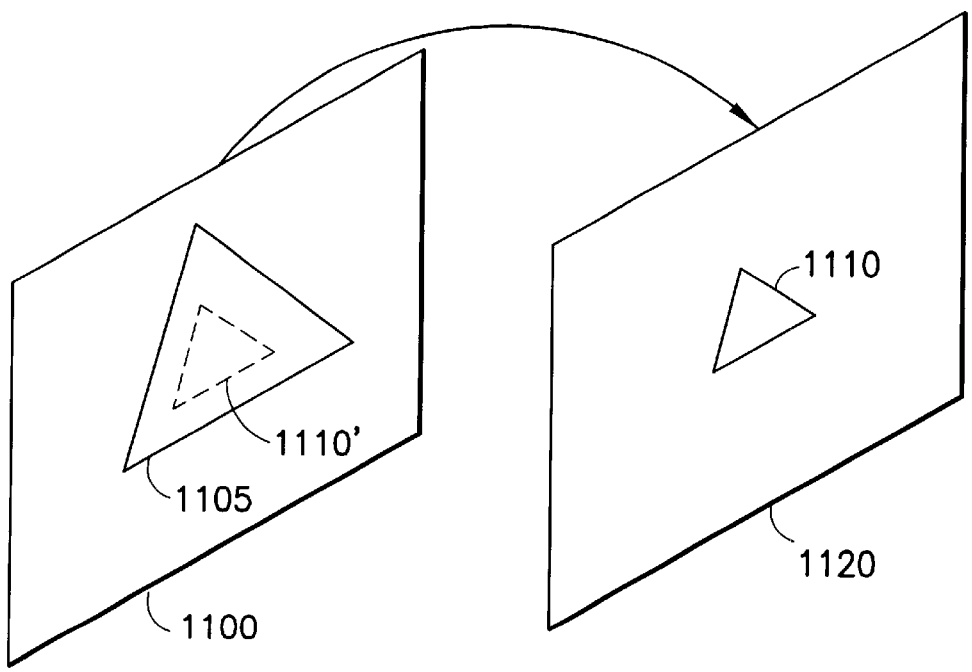
FIG. 11 illustrates a search area that is shaped according to the shape of the video object being coded in accordance with the present invention.

FIG. 11 illustrates a search area that is shaped according to the shape of the video object being coded in accordance with the present invention. A current frame 1120 includes a video object 1110 (e.g., VOP). A reference frame 1100 includes a search area 1105 that corresponds to the shape of the object 1110. Object 1110 corresponds to object 1110' at the time instant of the frame 1120 and it relates to the object 1110' by the MV.

Since the search area 1105 in the reference image 1100 as defined by the mask values obtained from the object 1110' corresponds to the shape of the coded video object 1110, the motion estimation is tailored to each object, and best match regions in the search area can be more quickly identified without having to search regions in which a best match region is unlikely to be found.

Matching Criteria for Shape Coding

The conventional ME uses a distance measure based on the nth order norm function, e.g., the Euclidean distance, to compute the error of the matching. An error is computed for different regions or portions of the search area in the reference image to represent how closely the regions match the current image. The region which yields the smallest error is considered to be the best match region.

The distance measure is the main computational load for the ME algorithm. In binary shape coding, all data are either "255" or "0". The absolute distance of binary shape coding is "255" times the Hamming distance if all data in binary alpha plane are "1" for "255" and "0" for "0", and, hence, the matching results using either the absolute distance or the Hamming distance are identical. The Hamming distance is much simpler than the nth order norm function and it can be implemented in a low level logic (using an exclusive OR gate), and it can complete the measure of one pixel in a single clock.

Absolute distance is defined as:

$$D_{abs} = |K(y) - X(Y)| + |K(Cb) - X(Cb)| + |K(Cr) - X(Cr)|$$

The Hamming distance is the number of coordinates in which the two inputs differ, and is calculated as follows:

$$D_{Hamming}(Y) = |\{i | K(Y)_i \neq X(Y)_i, i=0,1,\ldots,n-1\}|$$

$$D_{Hamming}(Cb) = |\{i | K(Cb)_i \neq X(Cb)_i, i=0,1,\ldots,n-1\}|$$

$$D_{Hamming}(Cr) = |\{i | K(Cr)_i \neq X(Cr)_i, i=0,1,\ldots,n-1\}|$$

Motion Vector Range for Shape Coding

A further consideration with the present invention is that the motion vector range for shape coding limits the search area of the block matching. In texture coding, the MPEG-4 parameter f_code specifies the search range per frame and, hence, the search range is larger for a frame that is further apart from its anchor frame. Specifically, the motion vector search range is up to $[-2^{f\_code+3}, 2^{f\_code+3}-0.5]$ where "0"<=f_code<=7.

Setting the motion vector range to be ±16 pixels for shape coding in the current MPEG-4 software improves the efficiency of motion estimation, especially for fast moving sequences.

The similar concept of coding motion vectors as in texture can be used to code motion vectors to improve their accuracy. That is, the accuracy of the motion vector can be modified as the search area is modified. The delta or offset motion vector, MVD, will be coded as two separate entities. The first part accounts for the most significant data, and will be coded using a VLC table. The second part contains the least significant data and will be coded using a Fixed Length coding (FLC) table with the length equal to f_code−1.

Experimental Results

Experimental results have proven the effectiveness of the suggested implementation for motion estimation. The results consider shape coding (allowing both 8×8 and 16×16 modes) and 16×16 mode for texture coding. Motion estimation in other modes remain unchanged.

A search range per frame in this test is ±16 pixels. The first 150 frames from five test sequences (CCIR-601 resolution), i.e., bream, children, news, stefan, and weather were tested. An I-VOP was provided every 15 frames, and a P-VOP every three frames (M=3) in all experiments. The coding results in all cases yield the similar coding bit rate and PSNR as the original MPEG-4, coded as will be shown next. The Quantization Parameter (QP) level is fixed at ten, and the software works in progressive mode.

Tests results showed a significant improvement for the new motion estimation scheme of the present invention relative to the method used in MPEG-4 (MoMuSys-VFCD-V02-980516). This MPEG-4 software fixes the search range for shape motion estimation to ±8 pixels, which is not correct based on MPEG-4 syntax. Hence, we modified the MPEG-4 software to expand the search range for shape motion estimation to ±16 pixels.

The improvement of the new motion estimation system with the new search range is shown in Table 1, below, for the video sequences "Stefan", and "Bream".

The table lists the total number of searches required for the respective video sequence using the efficient motion estimation technique of the present invention, along with the per cent savings realized relative to a conventional full search. The search range is also indicated (e.g., ±8 or ±16 pixels). A full pel macroblock search is used (half pel ME is disabled). As can be seen, the savings is significant in each case. And, of course, by reducing the encoding complexity, the cost of the associated equipment can be reduced, and processing speed is increased.

TABLE 1

Number of Motion Estimation Searches for "Stefan" and "Bream" video sequences

| Video Sequence | Picture Type | Shape Coding (±16) | Shape Coding (±8) | Texture Coding (±16) |
|---|---|---|---|---|
| Stefan | P | 4,404,471 (41%) | 824,631 (28%) | 2,302,182 (16%) |
| Stefan | B | 5,109,173 (44%) | 1,086,263 (34%) | 26,106,042 (30%) |
| Bream | P | 17,377,706 (59%) | 3,859,586 (49%) | 12,498,872 (18%) |
| Bream | B | 17,945,577 (58%) | 4,018,084 (49%) | 89,776,176 (21%) |

Conclusion As can be seen, an efficient motion estimation technique for an arbitrarily-shaped video object has been described. As shown in the experimental results, major contributions of this technique relies on the arbitrarily-shaped search range. The proposed technique works very well when the object consumes a relatively small area in the bounding box, e.g., as with the children sequence. Moreover, the present invention can be easily employed in an MPEG-4 encoder.

Although the invention has been described in connection with various specific embodiments, those skilled in the art will appreciate that numerous adaptations and modifications may be made thereto without departing from the spirit and scope of the invention as set forth in the claims.

For example, the invention may be adapted for with other video standards besides MPEG-4.

What is claimed is:

1. A method for motion estimation coding of an arbitrarily-shaped video object, comprising the steps of:

determining whether successive blocks of pixels of at least a portion of a reference video image are outside said video object, overlap said video object, or are inside said video object;

each block comprising a respective reference pixel and a plurality of associated neighboring pixels; and providing respective mask values corresponding to positions of said respective reference pixels in said reference video image according to whether the associated blocks are outside said video object, overlap said video object, or are inside said video object;

wherein said respective mask values indicate a search region in said reference video image for motion estimation coding of said video object that corresponds to a shape of said video object.

2. The method of claim 1, wherein:
said successive blocks are outside said video object when alpha plane values of the pixels in the block indicate an absence of said video object.

3. The method of claim 1, wherein:
said successive blocks overlap said video object when alpha plane values of at least one of the pixels in the block indicate an absence of said video object, and alpha plane values of at least another one of the pixels in the block indicate a presence of said video object.

4. The method of claim 1, wherein:
said successive blocks are inside said video object when alpha plane values of the pixels in the block indicate a presence of said video object.

5. The method of claim 1, wherein:
said respective mask values indicate a search region for shape motion estimation coding of said video object when the associated blocks overlap said video object.

6. The method of claim 5, wherein:
said respective mask values indicate a search region for shape motion estimation coding of said video object when the associated blocks overlap said video object, but are not outside or inside said video object.

7. The method of claim 1, wherein:
said respective mask values indicate a search region for texture motion estimation coding of said video object when the associated blocks overlap said video object, and are inside said video object.

8. The method of claim 7, wherein:
said respective mask values indicate a search region for texture motion estimation coding of said video object when the associated blocks overlap said video object, and are inside said video object, but are not outside said video object.

9. The method of claim 1, wherein:
said video object comprises at least first and second Video Object Planes (VOPs);
said first VOP being in said reference video image;
said second VOP being in a current video image that uses said search region for motion estimation coding.

10. The method of claim 1, wherein:
the respective reference pixel is a top, left pixel in each of said successive blocks.

11. The method of claim 1, wherein:
a common search range is used for both shape and texture motion estimation coding of said video object; and
said respective mask values are set for each of said blocks to indicate the search region for texture motion estimation by ORing: (a) the alpha plane values of the respective reference pixels of the blocks which indicate the search region for shape motion estimation with (b) the alpha plane values of the respective reference pixels of the blocks which are inside said video object in said reference video image.

12. The method of claim 1, wherein;
a Hamming distance is used as a distance measure for the motion estimation coding to determine a best match portion in said search region.

13. The method of claim 1, wherein said determining step comprises the steps of:
examining alpha plane values of the pixels in a first block of said blocks;

storing data corresponding to at least a portion of the alpha plane values which overlap a successive second block of said blocks; and retrieving the stored data for use in determining whether the second block is outside said video object, overlaps said video object, or is inside said video object.

14. The method of claim 1, comprising the further step of:

subsampling pixels of at least a portion of said reference video image according to a minimum size of said video object prior to said determining step.

15. The method of claim 1, wherein said determining step comprises the steps of:

examining alpha plane values of only a portion of the pixels in at least one of said blocks according to a minimum size of said video object.

16. An apparatus for motion estimation coding of an arbitrarily-shaped video object, comprising:

means for determining whether successive blocks of pixels of at least a portion of a reference video image are outside said video object, overlap said video object, or are inside said video object;

each block comprising a respective reference pixel and a plurality of associated neighboring pixels; and means for providing respective mask values corresponding to positions of said respective reference pixels in said reference video image according to whether the associated blocks are outside said video object, overlap said video object, or are inside said video object;

wherein said respective mask values indicate a search region in said reference video image for motion estimation coding of said video object that corresponds to a shape of said video object.

17. The apparatus of claim 16, wherein:

said successive blocks are outside said video object when alpha plane values of the pixels in the block indicate an absence of said video object.

18. The apparatus of claim 16, wherein:

said successive blocks overlap said video object when alpha plane values of at least one of the pixels in the block indicate an absence of said video object, and alpha plane values of at least another one of the pixels in the block indicate a presence of said video object.

19. The apparatus of claim 16, wherein:

said successive blocks are inside said video object when alpha plane values of the pixels in the block indicate a presence of said video object.

20. The apparatus of claim 16, wherein:

said respective mask values indicate a search region for shape motion estimation coding of said video object when the associated blocks overlap said video object.

21. The apparatus of claim 20, wherein:

said respective mask values indicate a search region for shape motion estimation coding of said video object when the associated blocks overlap said video object, but are not outside or inside said video object.

22. The apparatus of claim 16, wherein:

said respective mask values indicate a search region for texture motion estimation coding of said video object when the associated blocks overlap said video object, and are inside said video object.

23. The apparatus of claim 22, wherein:

said respective mask values indicate a search region for texture motion estimation coding of said video object when the associated blocks overlap said video object, and are inside said video object, but are not outside said video object.

24. The apparatus of claim 16, wherein:

said video object comprises at least first and second Video Object Planes (VOPs);

said first VOP being in said reference video image;

said second VOP being in a current video image that uses said search region for motion estimation coding.

25. The apparatus of claim 16, wherein:

the respective reference pixel is a top, left pixel in each of said successive blocks.

26. The apparatus of claim 16, wherein:

a common search range is used for both shape and texture motion estimation coding of said video object; and said respective mask values are set for each of said blocks to indicate the search region for texture motion estimation by ORing: (a) the alpha plane values of the respective reference pixels of the blocks which indicate the search region for shape motion estimation with (b) the alpha plane values of the respective reference pixels of the blocks which are inside said video object in said reference video image.

27. The apparatus of claim 16, wherein;

a Hamming distance is used as a distance measure for the motion estimation coding to determine a best match portion in said search region.

28. The apparatus of claim 16, wherein said determining means comprises:

means for examining alpha plane values of the pixels in a first block of said blocks;

means for storing data corresponding to at least a portion of the alpha plane values which overlap a successive second block of said blocks; and means for retrieving the stored data for use in determining whether the second block is outside said video object, overlaps said video object, or is inside said video object.

29. The apparatus of claim 16, further comprising:

means for subsampling pixels of at least a portion of said reference video image according to a minimum size of said video object prior to said determining step.

30. The apparatus of claim 16, wherein said determining means comprises:

means for examining alpha plane values of only a portion of the pixels in at least one of said blocks according to a minimum size of said video object.

* * * * *